United States Patent
Dallas et al.

(10) Patent No.: US 7,212,715 B2
(45) Date of Patent: May 1, 2007

(54) CABLE ELEMENT HAVING REPOSITIONABLE PRESSURE SENSITIVE ADHESIVE TO COUPLE BUFFER TUBES TO A CENTRAL STRENGTH MEMBER

(75) Inventors: George Dallas, Hickory, NC (US); Benoit Rollet, Maisons-Laffitte (FR); Christophe Meisch, Newton, NC (US); Serge Pouilly, Hickory, NC (US)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 10/875,290

(22) Filed: Jun. 25, 2004
(Under 37 CFR 1.47)

(65) Prior Publication Data

US 2005/0286843 A1    Dec. 29, 2005

(51) Int. Cl.
*G02B 6/44*    (2006.01)
(52) U.S. Cl. ............... 385/100; 385/103; 385/104; 385/106; 385/109; 385/113
(58) Field of Classification Search ............... 385/100
See application file for complete search history.

(56) References Cited

U.S. PATENT DOCUMENTS

| 4,110,001 | A | * | 8/1978 | Olszewski et al. ......... 385/111 |
| 4,557,558 | A | | 12/1985 | Bresser |
| 5,509,097 | A | | 4/1996 | Tondi-Resta et al. |
| 5,649,041 | A | | 7/1997 | Clyburn, III et al. |
| 5,754,724 | A | * | 5/1998 | Peterson et al. ............ 385/135 |
| 5,761,361 | A | | 6/1998 | Pfandl et al. |
| 5,835,658 | A | * | 11/1998 | Smith ......................... 385/136 |
| 6,167,179 | A | | 12/2000 | Weiss et al. |
| 6,292,611 | B1 | | 9/2001 | Chamberlain et al. |
| 6,355,879 | B1 | | 3/2002 | Bertini et al. |
| 6,424,769 | B1 | | 7/2002 | Olsson et al. |

FOREIGN PATENT DOCUMENTS

| EP | 0 518 738 A1 | 12/1992 |
| JP | 2002-014263 | 1/2002 |

* cited by examiner

*Primary Examiner*—Frank G. Font
*Assistant Examiner*—Mary El-Shammaa
(74) *Attorney, Agent, or Firm*—Sughrue Mion, PLLC

(57) ABSTRACT

A cable element and a method of making the same, in which the cable element has a central strength member, a plurality of buffer tubes are disposed on the central strength member, each of the plurality of buffer tubes encloses at least one signal transmission element, and a layer of pressure sensitive adhesive is provided on the central strength member. The pressure sensitive adhesive is a repositionable adhesive and releasably couples the plurality of buffer tubes to the central strength member such that the plurality of buffer tubes can be coupled and uncoupled repeatedly from the central strength member.

20 Claims, 2 Drawing Sheets

CABLE ELEMENT HAVING REPOSITIONABLE PRESSURE SENSITIVE ADHESIVE TO COUPLE BUFFER TUBES TO A CENTRAL STRENGTH MEMBER

FIELD OF THE INVENTION

The present invention relates to an cable element having buffer tubes that easily are removable and re-applicable to a central strength member (CSM). In particular, the present invention relates to an optical cable element using a repositionable pressure sensitive adhesive to couple buffer tubes to a central strength member, such as a glass reinforced plastic (GRP).

BACKGROUND OF THE INVENTION

Currently, a need exists to reduce the amount of packaging of optical cable elements and to develop optical cable elements with finger accessible buffer tubes that can be accessed easily in the field by a field technician. In the related art, buffer tubes are stranded (for example, helically or reverse helically) around a central strength member to form a stranded core. The thin walled buffer tubes are bound to the central strength member using a binder, yarn, or thread. In addition, each of the buffer tubes house an optical unit, such as one or more optical fibers or an optical fiber ribbon having a plurality of optical fibers that are held together in a planar array.

To reduce the amount of packaging and to develop a finger accessible buffer tube, thinner buffer tube walls have been used. However, the related art optical cable elements have several disadvantages. For example, the fibers inside the smaller buffer tubes, which may be less than 2 mm in diameter and have a wall thickness from 0.05 to 1 mm, can become stressed from mechanical forces from the interior of the cable. This is because polymeric buffer tube walls are compliant at such a thin wall thickness. Thus, the cable elements of related art have the adverse effect of exposing the optical fibers to radial stresses that are applied during further manufacturing steps. These stresses can originate from components such as the binders, the water swellable material, or the interior of the jacket.

Additionally, in the related art, the optical cable elements are formed by binding a thin walled buffer tube to a central strength member using a binder, yarn, or thread. However, to access the thin walled buffer tubes, it is necessary for a field technician to cut and remove the binding material prior to accessing the buffer tubes. Thus, the buffer tubes of the related art can be difficult to access in the field. Further, the binders or other similar stranding materials induce undesirable stresses on the buffer tubes.

SUMMARY OF THE INVENTION

The present invention is directed to a cable element that addresses the problems discussed above, as well as others. Specifically, the present invention relates to a cable element that reduces the amount of packaging, eliminates stranding materials and the stranding step, and improves access, particularly, access in the field. Additionally, the present invention eliminates binder materials and water swellable materials, and correspondingly, eliminates the stresses that would be induced on the buffer tubes by such binder materials or water swellable materials.

To overcome the problems associated with the related art cable elements, the present invention provides buffer tubes that are bonded adhesively to a central strength member, thereby eliminating the stranding material and the stranding step, as well as the stresses resulting therefrom. More particularly, the present invention couples the buffer tubes to the central strength member using a pressure sensitive adhesive that is a repositionable adhesive. In the present invention, the individual buffer tubes can be removed and reapplied to the central strength member, thereby permitting the buffer tubes to be kept in a more ordered cylindrical structure.

In a further aspect of the present invention, the cable element of the present invention comprises a central strength member, a plurality of buffer tubes disposed on the central strength member, and a layer of releasable pressure sensitive adhesive provided on the central strength member, wherein the layer of pressure sensitive adhesive releasably adheres the buffer tubes to the central strength member. The buffer tubes include at least one signal transmission element.

The above and other features of the invention including various and novel details of construction and process steps will now be more particularly described with reference to the accompanying drawings and pointed out in the claims. It will be understood that the particular optical fiber cable embodying the invention is shown by way of illustration only and not as a limitation of the invention. The principles and features of this invention may be employed in varied and numerous embodiment without departing from the scope of the invention.

BRIEF DESCRIPTION OF THE DRAWINGS

These and other features, aspects and advantages of the present invention will become more apparent with reference to the following detailed description of illustrative, non-limiting embodiments thereof, appended claims, and accompanying drawings, in which:

DESCRIPTION OF ILLUSTRATIVE NON-LIMITING EMBODIMENTS OF THE INVENTION

Hereinafter, illustrative, non-limiting embodiments of the present invention will be described in detail with reference to the attached drawings. The present invention is not restricted to the following illustrative embodiments, and many variations are possible within the spirit and scope of the present invention. Illustrative embodiments of the present invention are provided in order to more completely explain the present invention to one skilled in the art.

Figure 1:
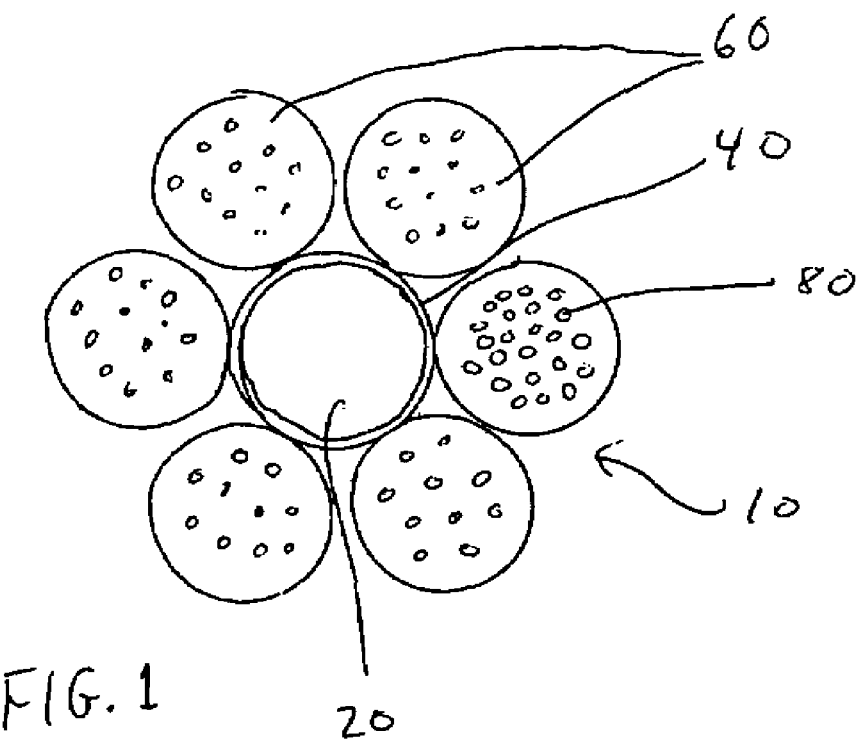
FIG. 1 is a cross-sectional view taken along section 1—1 of FIG. 2, according to an illustrative, non-limiting embodiment of the present invention.
Figure 2:
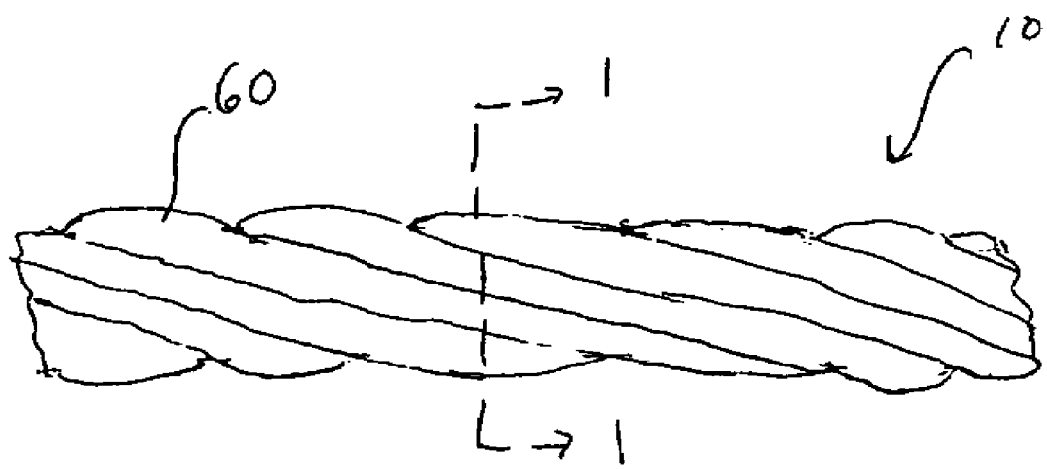
FIG. 2 is a side view according to an illustrative, non-limiting embodiment of the present invention.
Figure 3:
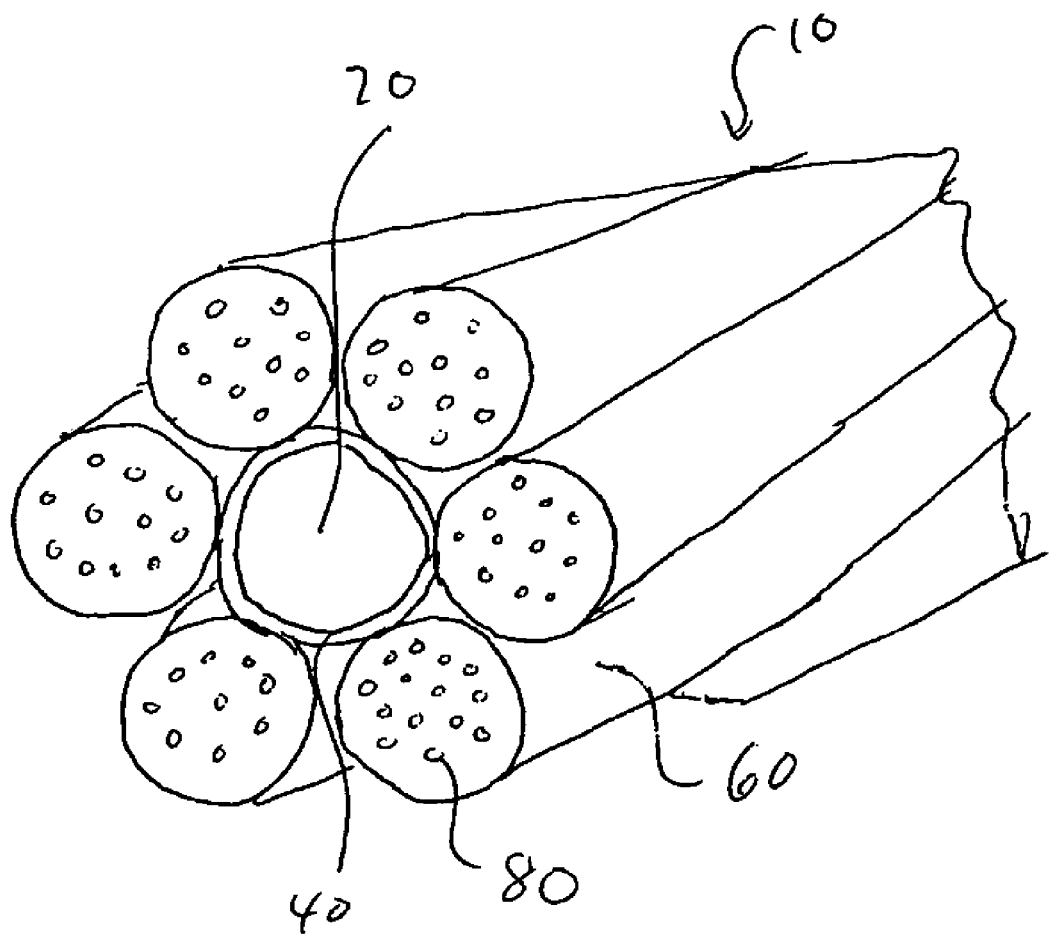
FIG. 3 is a perspective view according to yet another illustrative, non-limiting embodiment of the present invention.

FIG. 1 is a cross-section showing the buffer tubes bonded to the central strength member, such as a GRP. The buffer tubes are bonded across the length and have the applied twist from the oscillator. FIG. 2 is a side view according to an illustrative, non-limiting embodiment of the present invention. FIG. 3 is a perspective view according to yet another illustrative, non-limiting embodiment of the present invention.

As shown in the illustrative, non-limiting embodiment of the present invention depicted in FIG. 1, the cable element 10 includes a central strength member 20, a plurality of buffer tubes 60 disposed on the central strength member 20, and a layer of repositionable pressure sensitive adhesive 40. The buffer tubes 60 each enclose at least one optical fiber 80. The plurality of buffer tubes 60 can be wrapped around the central strength member 20 in any configuration, such as an SZ configuration. The layer of repositionable pressure sensitive adhesive 40 couples the plurality of buffer tubes 60 to the central strength member 20. In another illustrative, non-limiting embodiment of the invention, the layer of repositionable pressure sensitive adhesive 40 is permanently elastic. The layer of pressure sensitive adhesive 40 also may be a hot melt adhesive at ambient temperature.

According to the present invention, the layer of repositionable pressure sensitive adhesive 40 releasably couples the plurality of buffer tubes 60 to the central strength member 20. The fact that the pressure sensitive adhesive 40 is a repositionable adhesive allows the buffer tubes 60 to be removed from the central strength member 20 and to be applied again to central strength member 20 without the adhesive 40 losing its effectiveness.

As such, the layer of repositionable pressure sensitive adhesive 40 allows at least one of the buffer tubes 60 to be manually uncoupled from the central strength member 20 solely by exerting a force on the buffer tube 60 in a direction away from the central strength member 20. The direction away from the central strength member 20 can be any direction that causes one of the buffer tubes 60 to pull away from the central strength member 20. Furthermore, the buffer tube 60 also can be re-coupled to the central strength member 20 solely by exerting a force on the buffer tube 60 in a direction toward the central strength member 20. That is, by pushing the buffer tube 60 against the central strength member 20, the buffer tube 60 can be manually recoupled to the central strength member 20 by the repositionable pressure sensitive adhesive 40. In this way, the buffer tubes 60 of the present invention repeatedly can be coupled to and uncoupled from the central strength member, thereby providing, among other things, improved access in the field.

In the present invention, the coupling and recoupling of the buffer tubes to the central strength member can be accomplished at ambient temperature without subjecting the layer of repositionable pressure sensitive adhesive 40 to a heat source. In other words, no heating of the repositionable pressure sensitive adhesive 40 is necessary to uncouple or couple the buffer tubes 60 from the central strength member 20. Furthermore, according to the present invention, the buffer tubes 60 can be uncoupled from, and re-coupled to, the central strength member at ambient temperature without subjecting the layer of pressure sensitive adhesive 40 to a chemical reaction with any additional materials. Instead, the repositionable pressure sensitive adhesive 40 is operable to couple and uncouple the buffer tubes 60 to and from the central strength member 20 over the entire use range of the optical cable element 10. In this way, the layer of repositionable pressure sensitive adhesive 40 permits the plurality of buffer tubes 60 to be releasably adhered to the central strength member 20.

In addition, according to the illustrative, non-limiting embodiment, the layer of repositionable pressure sensitive adhesive 40 is provided as a thin layer around the central strength member 20. That is, the layer of pressure sensitive adhesive 40 does not flow around the individual buffer tubes 60. Therefore, the adhesive 40 does not leave a resin residue on the buffer tubes 60 when the buffer tubes 60 are uncoupled from the central strength member 20. Because there is no residue to be removed from the uncoupled buffer tubes 40 with a shaving tool, the process of cleaning the buffer tubes 40 is simplified.

The optical cable element of the present invention is made by applying a layer of repositionable pressure sensitive adhesive 40 on a surface of a central strength member 20, then releasably coupling a plurality of buffer tubes 60 on the central strength member 20 by laying the buffer tubes 60 on the repositionable pressure sensitive adhesive 40. The repositionable pressure sensitive adhesive 40 is preferably provided along the entire length of the central strength member 20 so that the buffer tubes 60 are bonded to the central strength member along their entire length. However, the invention is not limited in this respect, and the adhesive 40 can be applied intermittently to the central strength member 20.

The appropriate twist is applied to the buffer tubes by an oscillator. The buffer tubes can be coupled to the central strength member by applying pressure to the plurality of buffer tubes in a direction toward the central strength member or in a manner that initiates contact between the buffer tubes and the pressure sensitive adhesive. Therefore, no binders are necessary to couple the buffer tubes to the central strength member.

The plurality of buffer tubes can be wrapped around the central strength member in an SZ configuration, among other configurations. The layer of pressure sensitive adhesive may be permanently elastic. Additionally, the layer of pressure sensitive adhesive may be a hot melt adhesive at ambient temperature.

In another illustrative, non-limiting embodiment of the invention, the optical cable element is formed by the further steps of: uncoupling at least one buffer tube of the plurality of buffer tubes from the central strength member; and re-coupling the at least one buffer tube to the central strength member at ambient temperature without subjecting the layer of pressure sensitive adhesive to a heat source.

In another illustrative, non-limiting embodiment of the invention, the optical cable element is formed by the further steps of: uncoupling at least one buffer tube of the plurality of buffer tubes from the central strength member; and re-coupling the at least one buffer tube to the central strength member at ambient temperature without subjecting the layer of pressure sensitive adhesive to a chemical reaction from exposure to an additional material.

According to an illustrative, non-limiting embodiment of the present invention, initial samples were made with 1.4 mm polyolefin buffer tubes adhesively bonded to a 1.7 mm GRP pipe. Soft polyolefin buffer tubes were also used in the initial samples and were easy to manufacture and remained bonded from −40° C. to 70° C. In this embodiment, the adhesive was applied to the glass reinforced pipe through a die. More particularly, the adhesive used was Henkel Q8735 PSA and it was applied through a 1.9 mm die. The procedure worked flawlessly with both the adhesive and buffer tubes lying down easily on top of the GRP. Further, the adhesive was applied ahead of the oscillator and there were no problems with build-up.

In the present invention, it is possible to implement a pressure sensitive adhesive that is flexible over the use range of the cable to couple the buffer tubes to the central strength member. This allows the buffer tubes to be coupled to the central strength member without binders. This is advantageous because, once the cable element is accessed through the jacket, the buffer tubes can be accessed without cutting and/or removing the binding materials. In contrast, in the related art, the binder must be cut to access the buffer tubes.

Another advantage of the present invention is that the adhesion to the central strength member also controls the coefficient of thermal expansion (CTE) of the buffer tubes by coupling them to the low CTE central strength member. Thus, the likelihood of attenuation at low temperatures is reduced. Accordingly, proper adhesive strength can be maintained.

In the above aspects of the present invention, the buffer tubes are manually accessible, and therefore, can be accessed easily in the field by a field technician. The fact that there is no binder means that cutting tools are not needed to access the buffer tubes. This reduces the time and cost required for accessing the cable. Additionally, since the repositionable adhesive is used to couple the thin walled buffer tubes to the central strength member, the buffer tubes lay down precisely as the oscillator moves them, so the anticipated and actual amount of turns match. The present invention has the added advantage of allowing individual buffer tubes to be removed and reapplied easily at the installers' discretion. Moreover, the movement of the buffer tubes with temperature will be controlled more by the thermal expansion of the central strength member and be less random in nature.

According to the present invention, the need for binding can be eliminated and access to the buffer tubes can be improved. Additionally, binders and water swellable materials can be eliminated. Further, the stresses resulting from the use of binders, water swellable material, and/or the interior of the jacket can be eliminated.

The aforementioned advantages of the present invention can be accomplished by providing an optical cable element having buffer tubes that are bonded adhesively to a central strength member using a repositionable pressure sensitive adhesive, thereby eliminating the stranding material and the stranding step, as well as the stresses resulting therefrom. Additionally, the repositionable pressure sensitive adhesive can be a permanently elastic adhesive.

The present invention has the advantage that productivity, quality assurance, and product novelty can be increased. Further, the present invention has the advantage that the buffer tubes can be accessed by pulling the tubes away from the central strength member without damaging the tubes. Thus, the buffer tubes of the present invention can be separated manually in the field, simply by peeling off the buffer tubes. Similarly, the buffer tubes can be reapplied to the central strength member easily by hand in the field, simply by pressing the buffer tubes back onto the central strength member. As such, the buffer tubes of the present invention easily can be removed, repositioned, or reapplied to their original position.

The previous description of the preferred embodiments is provided to enable a person skilled in the art to make and use the present invention. Moreover, various modification to these embodiments will be readily apparent to those skilled in the art, and the generic principles and specific examples defined herein may be applied to other embodiments without the use of inventive faculty. For example, some or all of the features of the different embodiments discussed above maybe deleted from the embodiment. Therefore, the present invention is not intended to be limited to the embodiment described herein but s to be accorded the widest scope as defined by the limitations of the claims and equivalents thereof.

What is claimed is:

1. A cable element comprising:
a central strength member;
a plurality of buffer tubes disposed on the central strength member, wherein each of the plurality of buffer tubes encloses at least one signal transmission element; and
a layer of pressure sensitive adhesive provided on the central strength member, wherein the pressure sensitive adhesive is a repositionable adhesive;
wherein the layer of repositionable pressure sensitive adhesive couples the plurality of buffer tubes to the central strength member, wherein the layer of pressure sensitive adhesive is adapted to allow at least one buffer tube of the plurality of buffer tubes to be uncoupled from the central strength member solely by exerting a force on the at least one buffer tube in a direction away from the central strength member, and re-coupled to the central strength member solely by exerting a force on the at least one buffer tube in a direction toward the central strength member, wherein the layer of pressure sensitive adhesive is a hot melt adhesive at ambient temperature.

2. The cable element according to claim 1, wherein the at least one signal transmission element is an optical fiber.

3. The cable element according to claim 1, wherein the plurality of buffer tubes are wrapped around the central strength member in an SZ configuration.

4. The cable element according to claim 1, wherein the layer of pressure sensitive adhesive is permanently elastic.

5. The cable element according to claim 1, wherein the layer of pressure sensitive adhesive covers an entire surface of the central strength member.

6. The cable element according to claim 1, wherein each of the plurality of buffer tubes are coupled to the central strength member by the layer of pressure sensitive adhesive along an entire length of each of the plurality of buffer tubes.

7. The cable element according to claim 1, wherein the layer of pressure sensitive adhesive is a thin layer provided around the central strength member that does not flow around the individual buffer tubes.

8. A cable element comprising:
a central strength member;
a plurality of buffer tubes disposed on the central strength member, wherein each of the plurality of buffer tubes encloses at least one signal transmission element; and
a layer of pressure sensitive adhesive;
wherein the layer of pressure sensitive adhesive releasably couples the plurality of buffer tubes to the central strength member, wherein the layer of pressure sensitive adhesive is adapted to allow at least one buffer tube of the plurality of buffer tubes to be uncoupled from the central strength member solely by exerting a force on the at least one buffer tube in a direction away from the central strength member, and re-coupled to the central strength member solely by exerting a force on the at least one buffer tube in a direction toward the central strength member, and
wherein the layer of pressure sensitive adhesive is a hot melt adhesive at ambient temperature.

9. The cable element according to claim 8, wherein the at least one signa transmission element is an optical fiber.

10. The cable element according to claim 8,
wherein the layer of pressure sensitive adhesive is adapted to allow at least one buffer tube of the plurality of buffer tubes to be uncoupled from, and re-coupled to, the central strength member at ambient temperature without subjecting the layer of pressure sensitive adhesive to a heat source.

11. The cable element according to claim 8, wherein the layer of pressure sensitive adhesive is adapted to allow at least one buffer tube of the plurality of buffer tubes to be uncoupled from, and re-coupled to, the central strength member at ambient temperature without subjecting the layer of pressure sensitive adhesive to a chemical reaction with additional material.

12. The cable element according to claim 8, wherein the layer of pressure sensitive adhesive is a thin layer provided around the central strength member that does not flow around the individual buffer tubes.

13. A method of forming an optical cable element comprising:
applying a layer of pressure sensitive adhesive on a surface of a central strength member, wherein the pressure sensitive adhesive is a repositionable adhesive;
releasably coupling a plurality of buffer tubes on the central strength member by applying pressure to the plurality of buffer tubes in a direction toward the central strength member,
wherein each of the plurality of buffer tubes encloses at least one signal transmission element, wherein the layer of pressure sensitive adhesive is adapted to allow at least one buffer tube of the plurality of buffer tubes to be uncoupled from the central strength member solely by exerting a force on the at least one buffer tube in a direction away from the central strength member, and re-coupled to the central strength member solely by exerting a force on the at least one buffer tube in a direction toward the central strength member, and
wherein the layer of pressure sensitive adhesive is a hot melt adhesive at ambient temperature.

14. The method according to claim 13, wherein each of the plurality of buffer tubes encloses at least one signal transmission element.

15. The method according to claim 13, further comprising wrapping the plurality of buffer tubes around the central strength member in an SZ configuration.

16. The method according to claim 13, wherein the layer of pressure sensitive adhesive is permanently elastic.

17. The method according to claim 12, wherein the layer of pressure sensitive adhesive is a hot melt adhesive at ambient temperature.

18. The method according to claim 13, further comprising the steps of:
uncoupling at least one buffer tube of the plurality of buffer tubes from the central strength member; and
re-coupling the at least one buffer tube to the central strength member at ambient temperature without subjecting the layer of pressure sensitive adhesive to a heat source.

19. The method according to claim 13, further comprising the steps of:
uncoupling at least one buffer tube of the plurality of buffer tubes from the central strength member; and
re-coupling the at least one buffer tube to the central strength member at ambient temperature without subjecting the layer of pressure sensitive adhesive to a chemical reaction from exposure to an additional material.

20. The cable element according to claim 13, wherein the layer of pressure sensitive adhesive is a thin layer provided around the central strength member that does not flow around the individual buffer tubes.

* * * * *